May 23, 1950 C. N. SKINNER 2,508,546
DENTAL PATTERN
Filed March 30, 1948 2 Sheets-Sheet 1
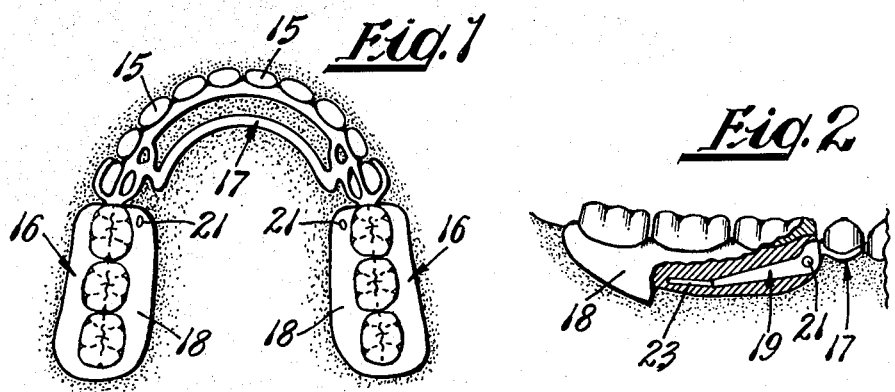
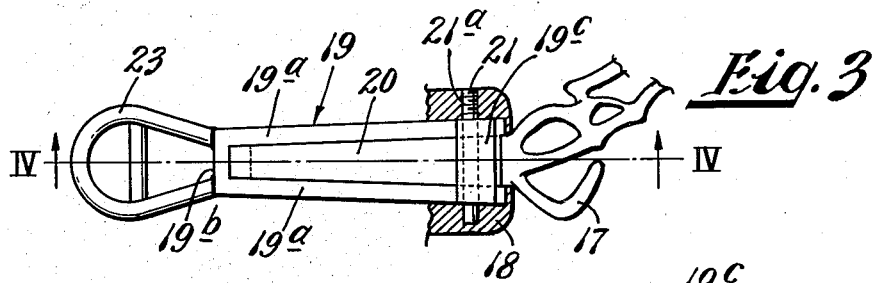
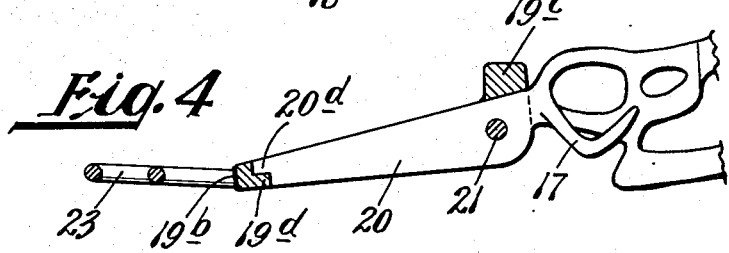
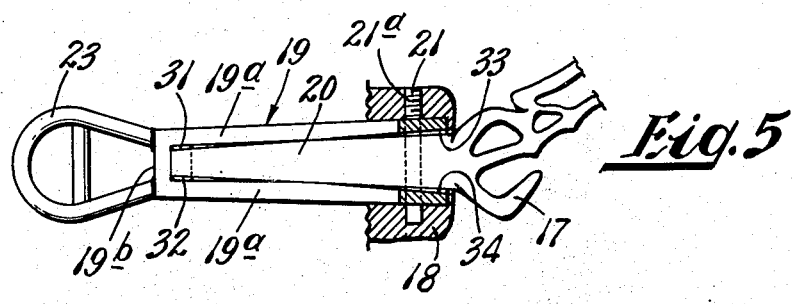
INVENTOR
C. N. SKINNER
BY
ATTORNEY

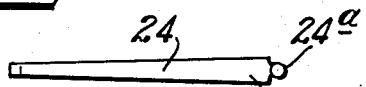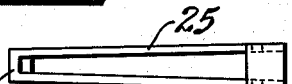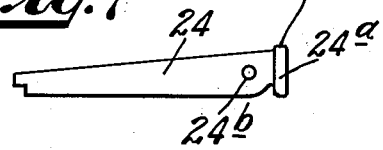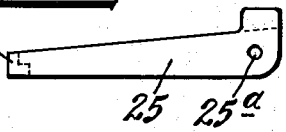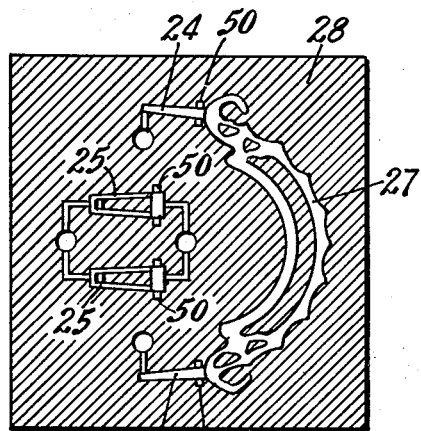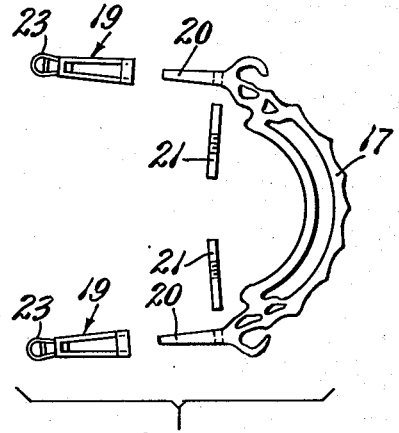

Patented May 23, 1950

2,508,546

UNITED STATES PATENT OFFICE 2,508,546

DENTAL PATTERN

Clawson N. Skinner, Whittier, Calif.

Application March 30, 1948, Serial No. 17,831

1 Claim. (Cl. 22—158)

This invention relates to partial dentures and more particularly to patterns for, and methods of fabricating partial dentures of the type disclosed in my prior Patent 2,279,351.

The prior patent teaches a detachable connection between a partial denture saddle and an anchor structure located at one end thereof. Specifically, the connection of the patent comprises a sleeve member in the saddle that receives a bar member projecting from the anchor structure.

The prior patent teaches several ways of forming the sleeve and bar members that constitute the connection, but in general, they are prefabricated in metal separate from the parts with which they are to be associated, the sleeve member being subsequently embedded in the denture saddle during the processing thereof, and the bar member being soldered to the anchoring device after the latter has been formed.

The prefabrication of the sleeve and bar members insures that they will fit each other properly, but some dentists do not have the skill and facilities for producing a strong solder connection between the bar member and the anchoring device. Furthermore, the anchoring device is often a metal casting fabricated to fit the natural teeth of the patient, by the well known lost wax process, and it would obviously be desirable to cast the bar member integral with the anchoring device. However, because of variable shrinkage of mold investments used in the lost wax process, it is impracticable for the average dentist to attempt to cast a bar member integral with the anchoring device and have that bar member properly fit a prefabricated sleeve member that he could purchase.

This problem is solved in accordance with the present invention by the use of special standardized prefabricated patterns of the bar and sleeve members. The dentist attaches the special pattern of the bar member to the wax pattern of the anchoring device that he has prepared by conventional methods, embeds the composite pattern in the mold investment, and drives the wax and special pattern out by heat, leaving a mold cavity in which the anchoring device and integral bar member are cast. The special pattern of the sleeve member is embedded in a block of the same mold investment and is heated in the oven simultaneously with the first mold so that the shrinkage of the two molds is the same, and the bar and sleeve members that are cast in the mold fit properly.

An object of the invention is to simplify and facilitate the production of partial dentures of the type in which detachable connection between the denture base and the anchor structure is effected by a bar member on the anchor structure that extends into a sleeve member in the denture base.

Another object is to provide patterns of the sleeve and bar members that enable dentists to cast the bar member integral with the anchoring structure without spoiling the fit between the bar and sleeve members.

A full understanding of the manner of accomplishment of the foregoing objects together with more specific objects and features of the invention may be had from the detailed description to follow with reference to the drawing, in which:

Fig. 1 is a plan view of a partial denture in accordance with the invention, shown anchored in position;

Fig. 2 is a side elevation with a part broken away, looking at the right side of Fig. 1;

Fig. 3 is an enlarged plan view of the bar and sleeve connection employed in the structure of Figs. 1 and 2, a small portion of the denture being shown in section;

Fig. 4 is a vertical section taken in the plane IV—IV of Fig. 3;

Fig. 5 is a view similar to Fig. 3 showing the members relieved to permit desired freedom of movement;

Figs. 6 and 7 are plan and side elevation views respectively of a special pattern to be used in forming the bar member;

Figs. 8 and 9 are plan and side elevation views respectively of a special pattern for use in forming the sleeve member;

Fig. 10 is a view somewhat schematic in nature but showing a composite pattern embedded in the mold investment material in the process of forming a mold by the lost wax process; and Fig. 11 is a plan view showing the component parts of the structure formed from the mold of Fig. 10.

Referring to Fig. 1, there is illustrated a lower bilateral partial denture comprising a pair of denture assemblies 16, 16 which replace the natural molars and are anchored in place by an anchor structure 17 which is secured to certain natural teeth 15. Each of the denture assemblies 16 comprises a base 18 of plastic or the like which is shaped to fit the tissues whereby masticatory forces are largely transferred directly to the tissues through the base 18 instead of being transferred through the anchor structure 17 to the natural teeth 15.

Referring now to Figs. 2, 3, and 4, connection between the anchoring structure 17 and each of the denture assemblies 16 is effected by means of a sleeve member 19, and is secured thereto by a pin 21 which extends through apertures provided therefor in the sleeve and bar members. One end of the pin 21 also extends through the plastic base 18 of the denture and is preferably secured in place by having threads 21a on the one end thereof which engage corresponding threads in the base 18.

The bar member 20 may be of rectangular cross section and tapered from a larger cross section at the end adjacent the anchoring structure 17 to a smaller cross section at the outer end. The sleeve member 19 may consist of a pair of sidewall members 19a lying alongside the bar 20 and connected at their outer ends by an end member 19b and at their large end by a cross member 19c. To provide additional anchorage of the sleeve member 19 in the denture base 18, an extension 23 may be soldered or otherwise secured to the outer end of the sleeve member 19. An important purpose of the connection of the denture assemblies 16 to the anchoring device 17 is to prevent the dentures from moving away from the tissues. To facilitate this purpose, upward movement of the outer end of the sleeve member 19 with respect to the bar member 20 is prevented by providing a step 19d (Fig. 4) projecting from the end member 19b of the sleeve member, which step is engaged by a corresponding step 20d on the outer end of the bar member 20.

As already pointed out, the bar member 20 is preferably formed integrally with the anchoring structure 17, particularly when the latter is itself a casting formed by the lost wax process. A pattern for production of the bar members 20 integral with the cast anchoring structure 17 may be produced by the use of special standardized, prefabricated patterns of the bar and sleeve members, respectively, as illustrated in Figs. 6 to 9 inclusive. Thus the pattern 24 of Figs. 6 and 7 corresponds in shape (as to its essential interfitting portions) with the bar member 20 of Figs. 3 and 4. The special pattern 25 fits the plastic bar pattern 24. These patterns 24 and 25 can be cast, pressed, or otherwise formed from some relatively hard and durable material that can be dissipated by heat. Suitable materials are polymers of methyl methacrylate, and polymers of the vinyl resins. They are quite different in this respect from soft wax patterns, which would not retain their shape during shipment and handling. The pattern 24 for the bar member 20 may have a suitable stub 24a at its rear end for attachment to the wax pattern 27 (Fig. 10) which has been prepared by the dentist in the usual manner. Fig. 10 shows this wax pattern 27 with the special patterns 24 extending therefrom positioned in an investment mold 28 in accordance with the lost wax process. A pair of special patterns 25 for the sleeve members 19 may also be positioned either in the same investment mold 28 or in a separate one. Unless an investment material is used that will run into the pin apertures 24b (Fig. 7) and 25a (Fig. 9) of the patterns, these apertures should be filled with a suitable material. If the casting is to be in gold, graphite is a suitable material. Such aperture-filling pins are shown at 50 in Fig. 10. When the mold 28 is heated in accordance with the usual practice of the lost wax process, the wax of the pattern 27 is volatilized and driven out of the mold, leaving in its place a mold cavity of corresponding shape. The special patterns 24 are likewise dissipated by the heat, so that they leave their true outline in the mold 28. The same is true of the special patterns 25. Further in accordance with the established procedure in the lost wax process, the mold 28 is then used to cast with molten metal the anchor structure 17 (Fig. 11) having the bar members 20 formed integrally therewith. The cooperating sleeve members 19 are likewise cast at the same time.

Because of the fact that the special pattern 24 of the bar member properly fitted the special pattern 25 of the sleeve member, and the corresponding elements 19 and 20 of Fig. 11 were cast in molds produced from the patterns 24 and 25 under identical conditions, the members 19 and 20 of Fig. 11 will fit each other properly despite shrinkage or expansion during the processing, inasmuch as any change in dimensions will be the same for both elements.

While embedding the sleeve members 19 in the denture base 18 (during the processing of the latter), the bar members 20 are inserted in the sleeve members 19, and the pins 21 are inserted as shown in Fig. 3, the threads 21a on the pin 21 extending beyond the sleeve member 19, so that when the denture base 18 is formed around the pin corresponding threads are formed in the base 18. By reason of this threaded connection, pin 21 can be screwed out of the base 18 at any time it is desired to disassemble the structure and withdraw the bar member 20 from the sleeve member 19.

The pins 21 are originally longer than as shown in Fig. 3, being cut off flush with the surface of the denture base 18 after the latter has been formed. The pins are shown in their original length in Fig. 11, from which it will be noted the pins are extended beyond their threaded portions. Forming the threads 21a (Fig. 3) in the portion of the pin 21 that is embedded in the plastic base 18, not only simplifies production by eliminating the operation of forming threads in sleeve member 19 or bar member 20, but permits the same patterns 24 and 25 to be used in both the right and left sides of dentures.

As shown in Fig. 5, a desired freedom of movement of the bar member 20 with respect to the sleeve member 19 may be obtained by relieving the bar member as indicated at the points 31 and 32 and/or relieving the sleeve member 19 at the points 33 and/or 34. This relieving may be performed by grinding or filing.

Although for the purpose of explaining the invention, a particular embodiment thereof has been shown and described, obvious modifications will occur to a person skilled in the art, and I do not desire to be limited to the exact details shown and described.

I claim:

An article of manufacture for use in casting by the lost wax process a bar member integral with a dental anchor structure and a cooperating sleeve member fitting said bar member, said article comprising: interfitting patterns of said bar and sleeve members of a material relatively hard and durable as compared to wax but dissipatable at temperatures employable in curing investments in the lost wax process.

CLAWSON N. SKINNER.

(References on following page)

REFERENCES CITED

The following references are of record in the file of this patent:

UNITED STATES PATENTS

| Number | Name | Date |
|---|---|---|
| 1,262,973 | Pack et al. | Apr. 16, 1918 |
| 1,357,503 | Lucier | Nov. 2, 1920 |
| 1,535,017 | Cline | Apr. 21, 1925 |
| 1,595,338 | Brazda et al. | Aug. 10, 1926 |
| 1,684,700 | Hauptmeyer | Sept. 18, 1928 |
| 2,056,415 | Young | Oct. 6, 1936 |
| 2,065,977 | Jefferies | Dec. 29, 1936 |
| 2,136,404 | Wheeler | Nov. 15, 1938 |
| 2,279,351 | Skinner | Apr. 14, 1942 |
| 2,323,685 | Skinner | July 6, 1943 |
| 2,362,507 | Steinbock et al. | Nov. 14, 1944 |
| 2,400,831 | Kohl | May 21, 1946 |
| 2,461,416 | Erdle et al. | Feb. 8, 1949 |

OTHER REFERENCES

Metals and Alloys, October 1943, pages 784–788, inclusive, "Precision Castings for Ordinance and Aircraft" by Wolf.